United States Patent [19]

Kenton

[11] 3,926,610

[45] Dec. 16, 1975

[54] REMOVAL OF FERTILIZER PRECIPITATE

[75] Inventor: Joseph R. Kenton, Bartlesville, Okla.

[73] Assignee: Phillips Petroleum Company, Bartlesville, Okla.

[22] Filed: June 10, 1974

[21] Appl. No.: 477,992

[52] U.S. Cl. ................................. 71/34; 71/64 C
[51] Int. Cl.² ........................................ C05B 1/00
[58] Field of Search ..................... 71/34, 43, 64 C

[56] References Cited
UNITED STATES PATENTS

| | | | |
|---|---|---|---|
| 3,113,858 | 12/1963 | Slack et al. | 71/64 C |
| 3,290,140 | 12/1966 | Young et al. | 71/34 |
| 3,676,100 | 7/1972 | Gerhardt et al. | 71/37 |

*Primary Examiner*—Charles N. Hart

[57] ABSTRACT

A process is disclosed wherein the precipitate formed during storage of a liquid phosphate-based fertilizer is removed by addition of phosphoric acid in an amount sufficient to form a solution thereof having a pH of less than about 3.2. Thereafter by pH adjustment such that there is provided a solution having a pH of 5.0 to 6.6, there is obtained a solution of the originally precipitated material which is in a form to be useful as a fertilizer.

3 Claims, No Drawings

REMOVAL OF FERTILIZER PRECIPITATE

This invention relates to liquid fertilizers.

More specifically, this invention relates to liquid phosphate-based fertilizers.

BACKGROUND OF THE INVENTION

The production of liquid phosphate-based fertilizers is well known in the art. Such fertilizers generally are those containing ammonium polyphosphate as the nitrogen phosphorus source. Such ammonium polyphosphate fertilizer solutions are commonly made by neutralizing phosphoric acid with ammonia. Following the initial neutralization the resulting ammonium polyphosphate solution is diluted with water to the desired concentration level to form the useful liquid fertilizer. One such well known and useful liquid fertilizer is that designated as 10-34-0 which contains 10 weight percent nitrogen, 34 weight percent $P_2O_5$ and no potash ($K_2O$).

Upon storage of such ammonium polyphosphate fertilizer solutions there is generally experienced the development of a precipitate within the storage system which forms a gelatinous sludge on the bottom of the storage system. After a period of time, unless removed in some manner there will result a clogging of transfer lines, outlets, drains and the like due to the ever-increasing volume of precipitate.

While the exact nature of the precipitant sludge is not known, it is believed that it is comprised of the metal impurities in the form of various complex polyphosphate salts as a result of the impurities which were originally present in the phosphoric acid utilized in the original formation of the solutions. Such impurities are in turn believed present as a result of the general practice of deriving the phosphoric acid as the so-called "green acid" from phosphate rock which often contains varying amounts of salts of magnesium, aluminum and iron. Prior to the present invention, the precipitant material had to be manually removed from time to time and as a result was not suitable for reuse and was thus dumped.

THE INVENTION

It is thus an object of this invention to provide a process for removing precipitant sludge from a storage system for phosphate-based fertilizer solutions.

Another object of this invention is to provide a process for the conversion of precipitant sludge to a useful fertilizer solution.

Other aspects, objects, advantages and embodiments of this invention will become apparent to those skilled in the art from the following detailed description of the invention.

In accordance with the present invention, I have now discovered that the precipitant sludge of polyphosphate complexes which forms in a storage system for phosphate-based fertilizers can be readily removed if acidified to a pH of less than 3.2.

In a further embodiment of this invention, I have also discovered that by adjusting the pH of the solution resulting from the initial acidification of the precipitant sludge to a pH of 5.0 to 6.6 there is provided a phosphate solution which is useful for conventional fertilizing purposes.

More specifically, I have now found that the precipitant formed in storage system for phosphate-based fertilizers can be readily removed by mixing at least the solids portion of the precipitant with sufficient acid to effect a pH of less than about 3.2.

Acids useful in accordance with this invention are the acids of phosphorus and nitric acid. Presently preferred acids are the orthophosphoric acid and acid solutions containing 75 to 55 weight percent of orthophosphoric acid and 25 to 45 weight percent of polyphosphoric acids. The pure phosphoric acid (98 percent $H_3PO_4$) can be used or the concentrated phosphoric acid can be diluted with water so that the final solution contains 10 to 70 percent by volume of water, preferably 10 to 30 percent by volume of water. Excess water should be avoided, since it makes the final solution too dilute.

By adjusting the pH of the thus-formed acidic solution of dissolved precipitate so as to form a solution having a pH in the range of 5.0 to 6.6 there is obtained a solution of the original precipitate which is in a form to be useful as a fertilizer.

Agents suitable for adjusting the pH of the solution having a pH less than about 3.2 are ammonia, KOH, $K_2CO_3$, $KHCO_3$, $NH_4HCO_3$, and $(NH_4)_2CO_3$. Presently preferred is the use of an aqueous ammonium solution because this is more easily maneuverable than the pure ammonia gas. Preferably, the pH of the solution is adjusted by these agents to a value of about 5.8 to 6.0.

For the purposes of this invention, all types of polyphosphate liquid fertilizers are apt to form that precipitate which is redissolved in accordance with this invention. Any ammonium polyphosphate fertilizer, whether it contains potassium or not, can show the sludge formation problem. The preferred group of aqueous fertilizer solutions, the sludges of which are to be treated in accordance with this invention, is defined by an analysis of about 9 to about 11 weight percent nitrogen and about 30 to about 37 weight percent $P_2O_5$, the rest being water.

Among these solutions, the above defined 10-34-0 fertilizer solution is preferred.

The invention will be more fully understood from the following examples.

EXAMPLE I

A fresh 10-34-0 fertilizer was prepared. After storage of 10 days a precipitate (about 6 volume %) had formed. A sample of this precipitate was mixed with supernatant liquid portion of the composite solution, agitated to make a slurry, filtered. The filter cake was washed so that the solids of the precipitate were recovered.

A first acid solution having a pH of 3.0 was made from wet process phosphoric acid, anhydrous ammonia and distilled water. A second acid solution was prepared from the same ingredients; however, the pH of this solution was adjusted to 3.6. Whereas the solids recovered above from the precipitate formed in the 10-34-0 container were soluble in the first acid solution having a pH of 3, these solids were not soluble in the second acid solution having a pH of 3.6.

EXAMPLE II

A total of 425 grams of thick sludge were recovered from the bottoms of several containers of 10-34-0 liquid fertilizer. To this sludge, 375 grams of superphosphoric acid were added. The superphosphoric acid used consisted of 68.12% by weight $P_2O_5$, 19.14% by weight of the contained $P_2O_5$ was in the form of polyphosphoric acid, the rest orthophosphoric acid, MgO content was 0.29% by weight. The thick sludge changed into an easily stirred liquid. The liquid was treated with an ammonium hydroxide solution. The quantity of ammonium hydroxide solution added was adjusted so that a pH of 5 to 6 was obtained. The final pH was adjusted to about 5.9. The temperature in the container where the neutralizing step was carried out was maintained at about 125° F or less by external cooling. The final product (1208 grams) contained a little gelatinous precipitate which was readily removed by centrifuging. However, the final product was free of the original sludge identified as mostly consisting of magnesium ammonium pyrophosphate. Samples of the final product (1), centrifuged liquid fraction of the final product (2), and filtered final product (3) were stored at room temperature and observed for stability. The results are shown in the following table:

TABLE

| Sample | 1st day | 2nd day | 3rd day | 6th day | 7th day |
|---|---|---|---|---|---|
| 1 | Clear top layer ca. 20 vol. % gelatinous precipitate | Clear top layer ca. 15% gelatinous precipitate | Slight haze ca 12½% gelatinous precipitate | Very cloudy ca. 12½% gelatinous precipitate | Very cloudy ca. 8% gelatinous precipitate |
| 2 | Clear No precipitate | Clear No precipitate | Slight haze No precipitate | Very cloudy No precipitate layer | Very cloudy Precipitate beginning to coat glass container walls |
| 3 | Clear No precipitate | Clear No precipitate | Slight haze No precipitate | Very cloudy No precipitate layer | Very cloudy Precipitate beginning to coat glass container walls |

The results of this example show that said sludge formed in a tank of a 10-34-0 solution can be redissolved by acidifying to a pH of 3. From this acid solution, a liquid fertilizer analyzing 10-34-0 can be made by treating the solution with ammonia until a pH of 5.9 is reached. This fertilizer solution can be stored for about 5 days at room temperature before reprecipitation begins.

Reasonable variations and modifications, which will be apparent to those skilled in the art, can be made in this invention without departing from the spirit of scope thereof.

I claim:

1. A process for treating the slurry precipitate of a liquid fertilizer consisting essentially of an aqueous solution of ammonium polyphosphate containing 10 weight percent of nitrogen, 34 weight percent of $P_2O_5$ and no potash, said process comprising
   a. mixing said slurry precipitate with an acid selected from the group consisting of the acids of phosphorus and nitric acid,
   b. adjusting the quantity of acid employed with respect to the quantity of liquid precipitate employed so that a solution having a pH of 3 is obtained,
   c. neutralizing said solution by the addition of ammonia to a pH in the range of about 5 to about 6.6.

2. A process in accordance with claim 1 wherein said slurry precipitate is mixed with an acid solution consisting of 75 to 55 weight percent of $H_3PO_4$ and 25 to 45 weight percent of polyphosphoric acid in a weight ratio of about 1:1.

3. A process in accordance with claim 1 wherein ammonia is added to neutralize said solution in such a quantity as to result in a solution having a pH of about 5.8 to 6.0.

* * * * *